(12) United States Patent
Yamashita et al.

(10) Patent No.: US 8,567,915 B2
(45) Date of Patent: Oct. 29, 2013

(54) INKJET RECORDING METHOD BY HEAT, INKJET RECORDING APPARATUS USING HEAT, AND INK FOR INKJET RECORDING BY HEAT

(75) Inventors: Yoshiro Yamashita, Kanagawa (JP); Hiroshi Inoue, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 235 days.

(21) Appl. No.: 13/091,629

(22) Filed: Apr. 21, 2011

(65) Prior Publication Data

US 2012/0113193 A1 May 10, 2012

(30) Foreign Application Priority Data

Nov. 5, 2010 (JP) ................................. 2010-248543

(51) Int. Cl.
*B41J 2/05* (2006.01)

(52) U.S. Cl.
USPC .............................. 347/56; 347/95; 347/100

(58) Field of Classification Search
USPC ............ 347/20, 56, 95, 100; 106/31.13, 31.6, 106/21.27; 523/160, 161
See application file for complete search history.

(56) References Cited

U.S. PATENT DOCUMENTS 6,572,227 B2 * 6/2003 Yamashita et al. ............ 347/100
2003/0043245 A1 3/2003 Yamashita et al.

FOREIGN PATENT DOCUMENTS

JP 2001-302951 10/2001
JP 2002-331739 11/2002

* cited by examiner

*Primary Examiner* — Juanita D Jackson

(74) *Attorney, Agent, or Firm* — Fildes & Outland, P.C.

(57) ABSTRACT

An inkjet recording method includes recording by ejecting liquid droplets of an ink onto a recording medium from an ejection head that ejects, by heat, the liquid droplets of the ink at an ejection amount with respect to one droplet of from 1 ng to 2 ng to thereby attach the liquid droplets of the ink to the recording medium, wherein the ink comprises a pigment having a volume average particle diameter of from 100 nm to 400 nm and has a dynamic contact angle of from 30° to 60°, 50 seconds after dropwise addition of 3 μl of the ink to plain paper.

8 Claims, 3 Drawing Sheets

INKJET RECORDING METHOD BY HEAT, INKJET RECORDING APPARATUS USING HEAT, AND INK FOR INKJET RECORDING BY HEAT

CROSS-REFERENCE TO RELATED APPLICATION

This Application is based on and claims priority under 35 USC 119 from Japanese Patent Application No. 2010-248543, filed on Nov. 5, 2010.

BACKGROUND

1. Technical Field

The invention relates to an inkjet recording method, an inkjet recording apparatus, and an ink for inkjet recording.

2. Related Art

For example, "an ink including a self-dispersible pigment, in which a dynamic contact angle with respect to plain paper one second after dropwise addition of 4 μl of the ink is 60° or less, a volume average particle diameter My of the pigment dispersed particles is from 150 to 250 nm, a pigment concentration is from 3 to 20% by weight, and a number of coarse particles having a particle diameter of from 0.5 to 5 μm among the pigment dispersed particles is from $5 \times 10^5$ particles/μl to $2 \times 10^7$ particles/μl" is disclosed.

SUMMARY

According to an aspect of the invention, there is provided an inkjet recording method including recording by ejecting liquid droplets of an ink onto a recording medium from an ejection head that ejects, by heat, the liquid droplets of the ink at an ejection amount with respect to one droplet of from 1 ng to 2 ng to thereby attach the liquid droplets of the ink to the recording medium, wherein the ink comprises a pigment having a volume average particle diameter of from 100 nm to 400 nm and has a dynamic contact angle of from 30° to 60°, 50 seconds after dropwise addition of 3 μl of the ink to plain paper.

BRIEF DESCRIPTION OF THE DRAWINGS

Exemplary embodiments of the present invention will be described in detail based on the following figures, wherein.

DETAILED DESCRIPTION

Figure 1:
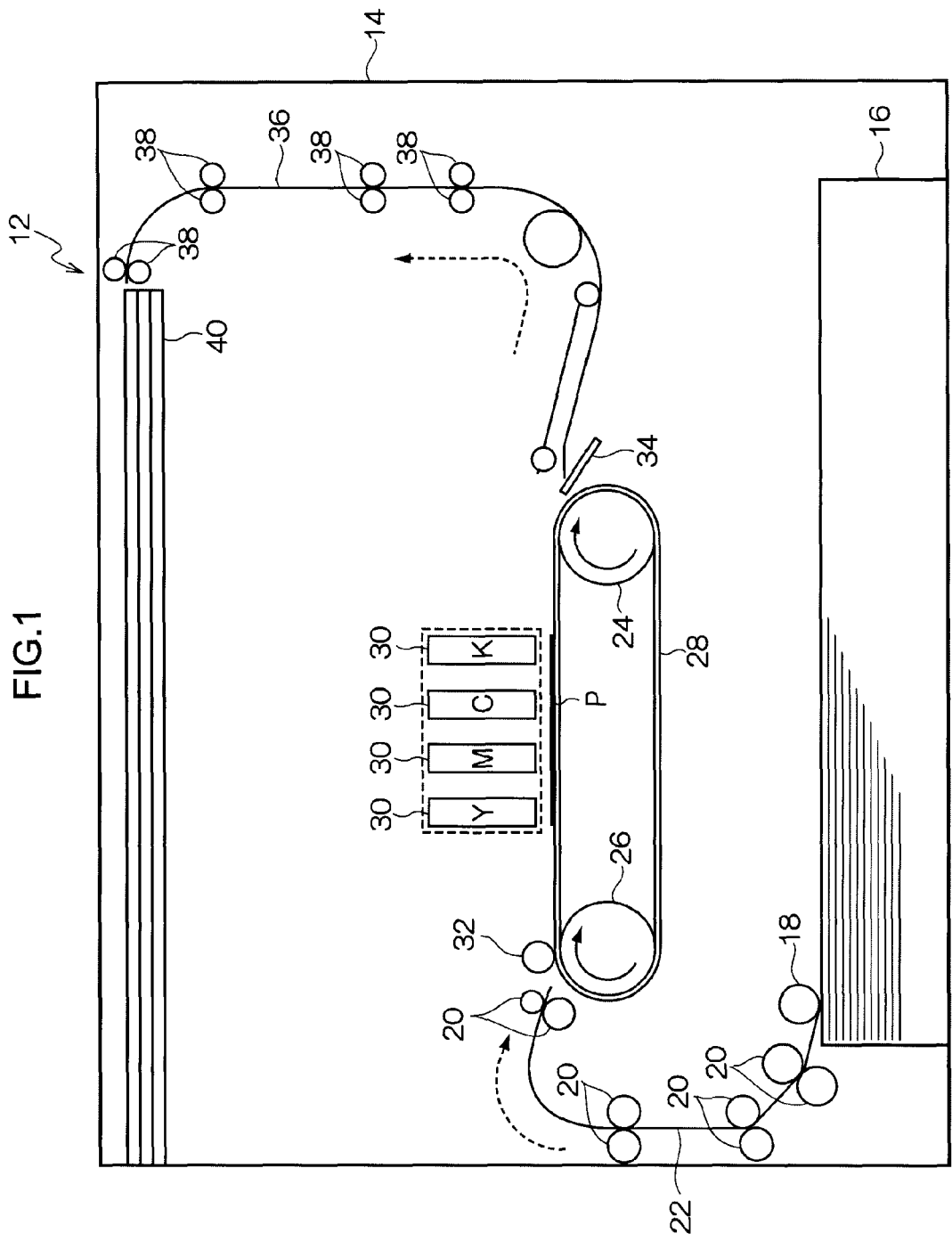
FIG. 1 is a schematic configuration drawing that shows an inkjet recording apparatus of the present exemplary embodiment.

Hereinafter the exemplary embodiment is explained in detail with referring to the drawings.

Figure 2:
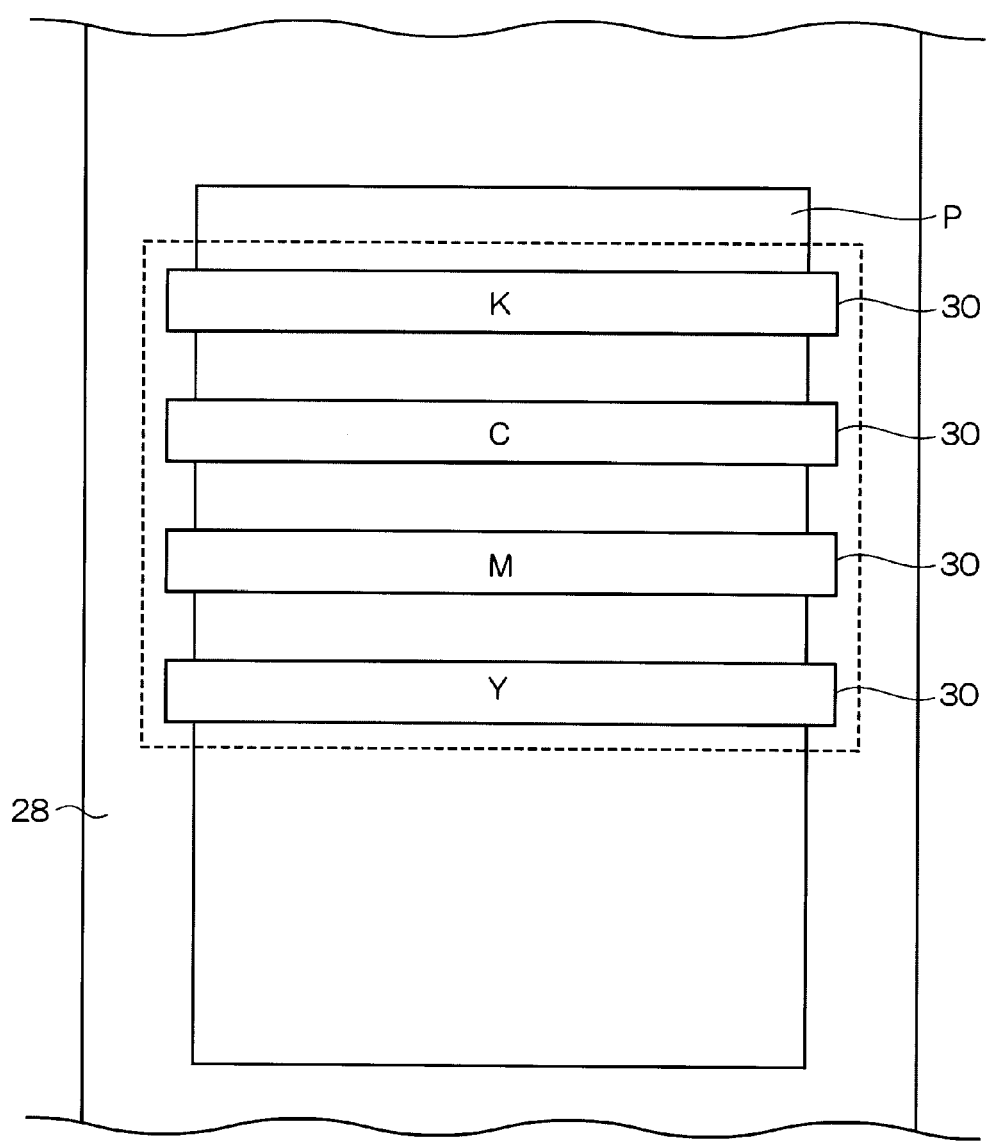
FIG. 2 is a partial plan view that shows the periphery of a recording head in the inkjet recording apparatus of the present exemplary embodiment.
Figure 3:
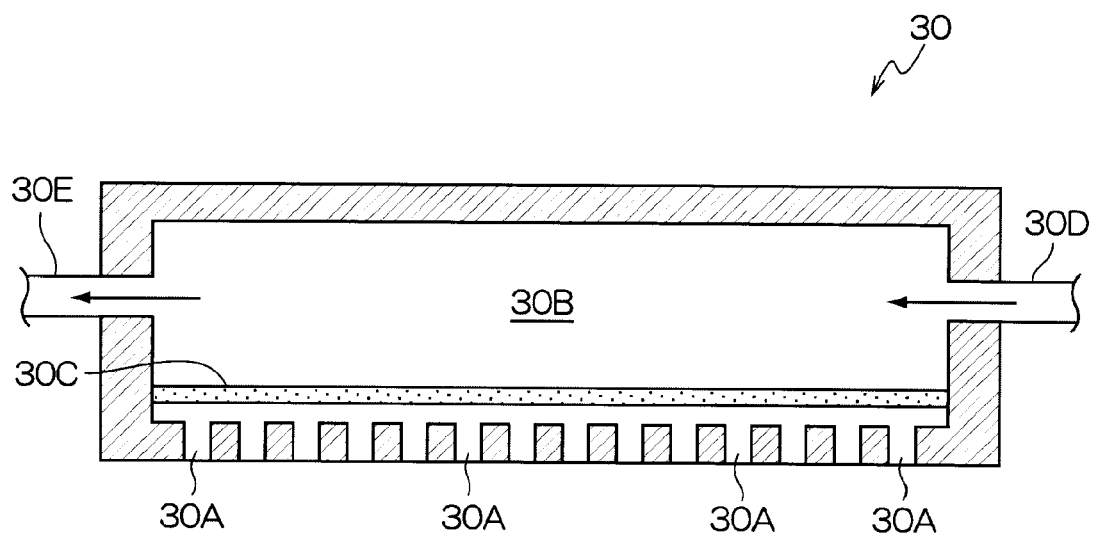
FIG. 3 is a schematic cross-sectional drawing that shows the recording head in the inkjet recording apparatus of the present exemplary embodiment.

FIG. 1 is a schematic configuration drawing that shows an inkjet recording apparatus of the present exemplary embodiment. FIG. 2 is a partial plan view that shows the periphery of a recording head in the inkjet recording apparatus of the present exemplary embodiment. FIG. 3 is a schematic cross-sectional drawing that shows the recording head in the inkjet recording apparatus of the present exemplary embodiment.

For example, as shown in FIGS. 1 to 2, an inkjet recording apparatus 12 of the present exemplary embodiment is equipped with a paper feeding container 16 at a lower part of the inside of a housing 14 and has a mechanism whereby paper P (an example of a recording medium) stacked in the paper feeding container 16 is ejected sheet by sheet by an ejection roll 18. The ejected paper P is conveyed by plural pairs of conveyance rollers 20 that form a feeding pathway 22.

An endless conveyance belt 28 is disposed at a position above the paper feeding container 16 such that the conveyance belt 28 is supported by a driving roll 24 and a driven roll 26 while tension is applied to the conveyance belt 28 by the driving roll 24 and the driven roll 26. Recording heads 30 are disposed above the conveyance belt 28 and face a flat part of the conveyance belt 28. A region of the flat part of the conveyance belt 28 that faces the recording heads 30 is an ejection area to which liquid droplets of an ink are ejected from the recording heads 30. The paper P that has been conveyed by the pairs of conveyance rollers 20 is held by the conveyance belt 28 and reaches the ejection area. The liquid droplets of the ink that have been ejected from the recording heads 30 in accordance with image information are applied to the paper P while the paper P faces the recording heads 30.

A charging roll 32 is disposed at an upstream side of the recording heads 30 (an upstream side in the conveyance direction of the paper P). The charging roll 32 rotates according to the rotation of the driving roll 24 while sandwiching the conveyance belt 28 and the paper P between the charging roll 32 and the driven roll 26. A potential difference between the charging roll 32 and the grounded driven roll 26 is generated, whereby the paper P adheres electrostatically to the conveyance belt 28 due to an electric charge imparted to the paper P.

A detachment plate 34 that detaches the paper P from the conveyance belt 28 is disposed on a downstream side of the recording heads 30 (a downstream side in the conveyance direction of the paper P). The detached paper P is conveyed by plural pairs of ejection rollers 38 that form an ejection pathway 36 at the downstream side of the detachment plate 34 (the downstream side in the conveyance direction of the paper P), and ejected into an ejected paper container 40 disposed at an upper part of the housing 14.

The recording head 30 (an example of the ejection head) is explained.

For example, as shown in FIG. 2, each of the recording heads 30 is an elongated recording head having an effective recording region (a region at which a nozzle for ejecting an ink is disposed), the width of which is not less than the width of the paper P (a length in direction that intersects with (for example, is orthogonal to) the conveyance direction).

As the recording heads 30, for example, four recording heads corresponding to the four colors of yellow (Y), magenta (M), cyan (C) and black (K) respectively are disposed in an array along the conveyance direction. The recording heads 30 are not limited to a format in which four recording heads 30 corresponding to each of the four colors are disposed. Depending on the purpose, the recording heads 30 may have a format in which one of the recording heads 30 corresponding to black (K) is disposed, or a format in which four or more recording heads 30 corresponding to four or more colors which include additional intermediate colors, respectively, are disposed.

Each of the recording heads 30 is a recording head which ejects liquid droplets of the ink by heat, which is called a thermal system, in which an ejection amount with respect to one liquid droplet of the ink to be ejected is from 1 ng to 2 ng (or from approximately 1 ng to approximately 2 ng) (preferably from 1 ng to 1.6 ng (or preferably from approximately 1 ng to approximately 1.6 ng)).

A method of adjusting the ejection amount with respect to one liquid droplet of the ink is, for example, a process including adjusting the size of a heater, the diameter of a nozzle, the pulse width and height of an input signal, and the like.

As shown in FIG. 3, the recording heads 30 each have, for example, nozzles 30A from which the liquid droplets of the ink are ejected, and a common ink chamber 30B which supplies the ink to the respective nozzles 30A. A filter 30C that filters coarse particles from the ink to be supplied from the common ink chamber 30B is disposed between the nozzles 30A and the common ink chamber 30B.

Although not shown in the drawings, the recording heads 30 each have an ink supply unit that supplies the ink through an ink supply tube 30D to the inside of each of the recording heads 30 (common ink chamber 30B) and discharges the ink through a discharge tube 30E from the inside of each of the recording heads 30 (common ink chamber 30B) to circulate the ink so as to supply the ink to the inside of each of the recording heads 30 from outside, whereby the recording heads 30 each have configuration in which the ink is supplied by a circulation system.

By employing such a configuration, sedimentation of a pigment inside the recording heads 30 may be suppressed even when an ink including a pigment having a relatively large particle diameter (a pigment having a volume average particle diameter of from 100 nm to 400 nm) is employed. As a result, clogging of the recording heads 30 (and the nozzles thereof) may be suppressed.

In the inkjet recording apparatus 12 of the present exemplary embodiment as explained above, recording is performed by ejecting the liquid droplets of the ink onto the paper P (recording medium) using the recording heads 30 that each eject the liquid droplets of the ink by heat at an ejection amount with respect to one droplet of from 1 ng to 2 ng and thereby attaching the liquid droplets of the ink to the paper P.

Since the recording heads 30 each have the characteristics that the liquid droplets of the ink are ejected by a thermal system and that the ejection amount with respect to one liquid droplet of the ink is small, it is thought that the ejection speed of the liquid droplets of the ink is fast, the specific surface area with respect to a unit weight of the liquid droplets of the ink is large, the drying time of the ink is short, and the penetration speed of the ink into the paper P is fast. Therefore, when the recording head 30 is employed, high-speed recording (for example, a printing speed (a conveyance speed of the paper P) of from 30 to 60 sheets per 1 minute for A4 size paper) may be realized.

When the ejection amount with respect to one liquid droplet of the ink is too small (when the ejection amount is lower than 1 ng), the liquid droplets of the ink are too light, and thus the ejection positions of the liquid droplets of the ink tend to be offset due to air flow and the like.

However, under current circumstances, when the recording heads 30 having such characteristics are employed, the optical density of the recording image to be obtained tends to decrease.

Therefore, an ink for inkjet recording which includes a pigment having a volume average particle diameter of from 100 nm to 400 nm and has a dynamic contact angle of from 30° to 60°, 50 seconds after dropwise addition of 3 µl of the ink to the plain paper, (hereinafter simply referred to as an ink) is employed in the present exemplary embodiment.

By employing the ink of the present exemplary embodiment, recording of an image having high optical density may be realized by the inkjet recording apparatus 12 in which the recording heads 30 are in the present exemplary embodiment.

Although the reason is unclear, it is thought that the pigment in the ink tends to remain on the surface of the paper P since a pigment having a large volume average particle diameter within the range described above and having a high dynamic contact angle is employed, i.e., the ink has decreased penetration speed of the ink into the paper P as a physical characteristic of the ink itself. It is thought that the influence on high-speed printing is small even when the ink has a decreased penetration speed of the ink into the paper P since the ejection amount with respect to one liquid droplet of the ink is small as described above.

In the present exemplary embodiment, it is thought that diffusion of the ink on the paper P may be suppressed and bleeding of the ink is also suppressed since the ink has a decreased penetration speed of the ink into the paper P as a physical characteristic of the ink itself. That is, in the present exemplary embodiment, recording of an image which may have high optical density and in which bleeding of the ink may be suppressed is easier to realize at high-speed.

Hereinafter, the ink used for the inkjet recording apparatus 12 of the present exemplary embodiment (hereinafter referred to as the ink of the present exemplary embodiment) is explained.

The ink of the present exemplary embodiment includes a pigment having a volume average particle diameter of from 100 nm to 400 nm. Furthermore, the ink of the present exemplary embodiment has a property in which a dynamic contact angle is from 30° to 60°, 50 seconds after dropwise addition of 3 µl of the ink to plain paper.

The dynamic contact angle 50 seconds after dropwise addition of 3 µl of the ink to the plain paper is from 30° to 60° (or from approximately 30° to approximately 60°), and preferably from 35° to 55° (or preferably from approximately 35° to approximately 55°).

When the dynamic contact angle is lower than 30°, or when the ink fully penetrates the plain paper and a measurement cannot be conducted, the penetration speed of the ink into the paper P is too fast, and the pigment in the ink tends to remain on the surface of the paper P, whereby the optical density is decreased, and bleeding of the ink tends to occur. When the dynamic contact angle is more than 60°, the speed of penetration of the ink into the paper P is too slow and the drying time of the ink increases, whereby it is difficult to perform high-speed printing.

Methods of adjusting the dynamic contact angle include, for example, (1) a method of adjusting a combination of the kind and amount of the surfactant, (2) a method of fine-adjusting the kind and amount of a water-soluble organic solvent, and (3) a method of adjusting the kind and amount of other additive.

As used herein, the dynamic contact angle refers to a contact angle after a specific time has elapsed after dropwise addition of the ink to the plain paper, i.e., an angle between the surface of the liquid droplet of the ink and the plain paper at a liquid-contact portion between the liquid droplet of the ink and the plain paper. In a state when the liquid droplet of the ink has completely penetrated the paper, the dynamic contact angle is 0°.

The dynamic contact angle in the present exemplary embodiment is the angle described above 50 seconds after dropwise addition of 3 µl of the ink to the plain paper under conditions of 23° C. and 55% RH.

As a measurement apparatus for measuring the dynamic contact angle, a dynamic contact angle meter FIBRO1100DAT (manufactured by Matsubo Corporation) is used.

The plain paper used for the measurement of the dynamic contact angle refers to the paper P that is used for the inkjet recording apparatus (method), and color/monochrome copy paper (trade name: C2, manufactured by Fuji Xerox Co., Ltd.) is used as a representative type of plain paper. The reason why the color/monochrome copy paper C2 is used as a representative type of plain paper is that the color/monochrome copy paper C2 is widely marketed as copy paper or the like, and is suitable for the measurement of the dynamic contact angle since the color/monochrome copy paper C2 shows standard penetration properties with respect to ink among the different types of paper generally known as plain paper.

Next, the composition of the ink of the present exemplary embodiment is explained.

The ink of the present exemplary embodiment includes for example, a pigment, water and an aqueous organic solvent, and other additive as necessary.

The pigment to be used in the present exemplary embodiment is explained.

As the pigment, a pigment having a volume average particle diameter of from 100 nm to 400 nm (or from approximately 100 nm to approximately 400 nm) (preferably from 100 nm to 300 nm, and more preferably from 100 nm to 250 nm (or preferably from approximately 100 nm to approximately 300 nm, and more preferably from approximately 100 nm to approximately 250 nm)) is used.

When the volume average particle diameter of the pigment is less than 100 nm, a favorable optical density of the recording image is not obtained. When the volume average particle diameter of the pigment exceeds 400 nm, the dispersibility of the pigment is deteriorated and the tendency of the pigment to settle down is increased, whereby the recording head is clogged and a favorable optical density of the recording image is not obtained.

The volume average particle diameter of the pigment in the obtained ink is measured by a dynamic light scattering method using a Nanotrac particle size distribution measurement apparatus (model name: UPA-EX150, manufactured by Nikkiso Co., Ltd.). The measurement temperature is 25° C.

Examples of the pigment having the above-mentioned volume average particle diameter include the following pigments.

Examples of black pigments include CAB-O-JET 400 and SMP-1-0351.

Examples of cyan pigments include CAB-O-JET 450C.

Examples of magenta pigments include CAB-O-JET 480V.

Examples of yellow pigments include CAB-O-JET 270Y and CAB-O-JET 470Y.

The content of the pigment is preferably from 4% by weight to 8% by weight (or preferably from approximately 4% by weight to approximately 8% by weight), more preferably from 4% by weight to 7.5% by weight (or more preferably from approximately 4% by weight to approximately 7.5% by weight), and further preferably from 4% by weight to 7% by weight (or further preferably from approximately 4% by weight to approximately 7% by weight).

When the content of the pigment is less than 4% by weight, it may be difficult to obtain a favorable optical density of the recording image, in some cases. When the content of the pigment is more than 8% by weight, more pigments tend to settle down, whereby the recording head may be clogged and it may be difficult to obtain a favorable optical density of the recording image, in some cases.

The water to be used in the present exemplary embodiment is explained.

The water is, for example, ion exchanged water, ultrapure water, distilled water or ultrafiltration water to prevent incorporation of especially impurities.

The aqueous organic solvent to be used in the present exemplary embodiment is explained.

Examples of the water-soluble organic solvent include polyhydric alcohol such as ethylene glycol, diethylene glycol, propylene glycol, polyethylene glycol, triethylene glycol, glycerin, trimethylolpropane, 1,2,6-hexanetriol, 1,5-pentanediol or dipropylene glycol; a sulfur-containing solvent such as thiodiethanol, 2-mercaptoethanol, thioglycerol, sulfolane or dimethylsulfoxide; and a nitrogen-containing solvent such as 2-pyrrolidone, N-methyl-2-pyrrolidone, cyclohexylpyrrolidone, triethanolamine or diethanolamine.

The content of the water-soluble organic solvent is preferably in the range of, for example, from 1% by weight to 70% by weight.

The ratio of the water to the water-soluble organic solvent (water: water-soluble solvent) is preferably from 80:20 to 50:50.

The other additive to be used as necessary in the present exemplary embodiment is explained.

The scope of the ink of the present exemplary embodiment may include a surfactant as a penetrating agent or a solvent-based penetration agent (glycol ether or the like) for the purpose of adjusting the speed of penetration into paper and the like.

Examples of the surfactant include a nonionic surfactant, an anionic surfactant, a cationic surfactant and an amphoteric surfactant. Among these, the nonionic surfactant, the anionic surfactant and the amphoteric surfactant are preferable.

Examples of the nonionic surfactant include polyoxyethylene alkyl phenyl ether, polyoxyethylene alkyl ether, polyoxyethylene fatty acid ester, sorbitan fatty acid ester, polyoxyethylene sorbitan fatty acid ester, polyoxyethylene glycerin fatty acid ester, polyglycerin fatty acid ester, polyoxyethylene sorbitan fatty acid ester, polyoxyethylene sterol, polyoxyethylene polyoxypropylene ether, polyoxyethylene fatty acid amide, a polyoxyethylene polyoxypropylene block copolymer, a nonionic acetylene glycol-based surfactant, tetramethyldecinediol, and a tetramethyldecinediol ethylene oxide adduct.

Examples of the anionic surfactant include an alkylbenzene sulfonic acid salt, an alkylphenyl sulfonic acid salt, an alkylnaphthalene sulfonic salt, a salt of higher fatty acid, a sulfuric acid ester salt of higher fatty acid ester, a sulfonic acid salt of higher fatty acid ester, a sulfuric acid ester salt and sulfonic acid salt of higher alcohol ether, a higher alkyl sulfosuccinic acid salt, a formalin condensate of a naphthalene sulfonic acid salt, a polystyrene sulfonic acid salt, a polyacrylic acid salt, a polyoxyethylene alkyl ether phosphoric acid salt, an alkyl ether carboxylic acid salt, an alkyl sulfuric acid salt, an acrylic acid-acrylic acid ester copolymer, a methacrylic acid-methacrylic acid ester copolymer, a styrene-acrylic acid copolymer, a styrene-acrylic acid-acrylic acid ester copolymer, a styrene-methacrylic acid copolymer, and a styrene-methacrylic acid-methacrylic acid ester copolymer.

Examples of the amphoteric surfactant include betaine; sulfobetaine; sulfate betaine; imidazoline; a silicone-based surfactant such as a polysiloxane polyoxyethylene adduct; a fluorine-based surfactant such as a perfluoroalkyl carboxylic acid salt, a perfluoroalkyl sulfonic acid salt, or oxyethylene perfluoroalkyl ether; and a biosurfactant such as spiculisporic acid, rhamnolipid or lysolecithin.

The HLB (a hydrophilic group/hydrophobic group balance) of these surfactants is preferably in the range of from 8 to 15 from the viewpoint of imparting suitable penetration property to the ink.

Examples of the solvent-based penetration agent include ethylene glycol monomethyl ether, ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monohexyl ether, triethylene glycol monomethyl ether, triethylene glycol monoethyl ether, triethylene glycol monopropyl ether, triethylene glycol monobutyl ether, triethylene glycol monohexyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether and dipropylene glycol monopropyl ether.

The content of the penetration agent may be, for example, from 0.01% by weight to 7% by weight (preferably from 0.02% by weight to 5% by weight, and more preferably from 0.05% by weight to 3% by weight) in the case of a black ink. The content of the penetration agent may be, for example, from 0.05% by weight to 15% by weight (preferably from 0.1% by weight to 10% by weight, and more preferably from 0.2% by weight to 8% by weight) in the case of a color ink other than the black ink.

The scope of the ink of the present exemplary embodiment may include, as a pH adjusting agent, an acid such as hydrochloric acid, sulfuric acid, nitric acid, acetic acid, citric acid, oxalic acid, malonic acid, boric acid, phosphoric acid, phosphorous acid, lactic acid, or the like; a base such as sodium hydroxide, potassium hydroxide, lithium hydroxide, ammonia, or the like; and various buffers such as a phosphorus acid, an oxalic acid salt, an amine salt, Good's buffers, or the like.

The scope of the ink of the present exemplary embodiment may include a physical property-adjusting agent such as polyethylene imine, polyamine, polyvinyl pyrrolidone, polyethylene glycol, a cellulose derivative, or the like; a clathrate compound such as cyclodextrin, polycyclodextrin, macrocyclic amine, crown ether, or the like; and a solubilizing agent such as acetamide, betaine, urea, an analog thereof, or the like. The scope of the ink of the present exemplary embodiment may also include an anti-mildew agent, an antirust agent, a sterilizer, a chelating agent, a dendrimer or the like, as necessary.

Favorable physical characteristics of the ink of the present exemplary embodiment are explained.

The pH of the ink is, for example, in a range of 7 or more (preferably in the range of from 7 to 11, and more preferably from 8 to 10).

As the pH of the ink used herein, a value measured under an environment at a temperature of 23±0.5° C. and a humidity of 55±5% R.H. by a pH/conductivity meter (trade name: MPC227, manufactured by Mettler-Toledo International Inc.) is employed.

The surface tension of the ink is, for example, in a range of from 20 mN/m to 40 mN/m (preferably from 25 mN/m to 35 mN/m).

As the surface tension as used herein, a value measured by a Wilhelmy's surface tension meter (manufactured by Kyowa Interface Science Co., Ltd.) under an environment of 23° C. and 55% RH is adopted.

The conductivity of the ink is, for example, in a range of from 0.01 S/m to 0.5 S/m (preferably a range from 0.01 S/m to 0.25 S/m, and more preferably a range from 0.01 S/m to 0.20 S/m).

The conductivity is measured by a pH/conductivity meter (trade name: MPC227, manufactured by Mettler-Toledo International Inc.).

The viscosity of the ink is, for example, in a range of from 1.5 mPa·s to 30 mPa·s (preferably a range from 3 mPa·s to 20 mPa·s).

The viscosity is measured by a measurement apparatus (trade name: RHEOMAT 115, manufactured by Contraves) under conditions of a measurement temperature of 23° C. and a shear speed of 1400 s$^{-1}$.

EXAMPLES

Hereinafter, the exemplary embodiment of the invention is explained in further detail with reference to examples, but the invention is not in any way limited to these Examples.

Example 1

—Preparation of Ink—
CAB-O-JET 400 (manufactured by Cabot Corporation, pigment concentration: 15% by weight): 33 parts by weight
Glycerin: 15 parts by weight
Oxyethylene 2-ethylhexyl ether: 0.25 parts by weight
Oxyethylene oleyl ether: 0.07 parts by weight
Urea: 6 parts by weight
Pure water: balance
The above composition is mixed and filtered by a 5 μm filter to obtain Bk ink 1.
—Inkjet Recording—
An inkjet recording apparatus is provided that is equipped with an elongated-shaped thermal system recording head having an effective recording area the width of which is at least the width of paper and an ejection amount of an ink with respect to one liquid droplet adjusted to 1.4 ng. Regarding the ink supply to the recording head, a circulation system in which the ink is circulated between the inside of the recording head (common ink chamber) and a subtank is employed.

Image recording is performed using the obtained Bk ink 1 and the above inkjet recording apparatus.

Comparative Example 1

The same inkjet recording apparatus is provided as in Example 1 except that the ejection amount with respect to one liquid droplet of the ink is adjusted to 2.8 ng.

Image recording is then performed using the Bk ink 1 prepared in Example 1 and the inkjet recording apparatus.

Comparative Example 2

—Preparation of Ink—
CAB-O-JET 300 (manufactured by Cabot Corporation, pigment concentration: 15% by weight): 33 parts by weight
Diethylene glycol: 20 parts by weight
Oxyethylene oleyl ether: 0.08 parts by weight
Pure water: balance
The above composition is mixed and filtered by a 5 μm filter to obtain Bk ink 2.

—Inkjet Recording—

The same inkjet recording apparatus is provided as in Example 1 except that the ejection amount with respect to one liquid droplet of the ink is adjusted to 1.5 ng.

Image recording is then performed using the obtained Bk ink 2 and the inkjet recording apparatus.

Comparative Example 3

—Preparation of Ink—

CAB-O-JET 400 (manufactured by Cabot Corporation, pigment concentration: 15% by weight): 40 parts by weight
Glycerin: 15 parts by weight
Oxyethylene 2-ethylhexyl ether: 0.1 parts by weight
Oxyethylene oleyl ether: 0.05 parts by weight
Pure water: balance The above composition is mixed and filtered by a 5 μm filter to obtain Bk ink 3.

—Inkjet Recording—

The same inkjet recording apparatus is provided as in Example 1 except that the ejection amount with respect to one liquid droplet of the ink is adjusted to 1.3 ng.

Image recording is then performed using the obtained Bk ink 3 and the above-mentioned inkjet recording apparatus.

Comparative Example 4

—Preparation of Ink—

CW-1 (manufactured by Orient Chemical Industries, Co., Ltd., pigment concentration: 20% by weight): 25 parts by weight
Polyethylene glycol: 25 parts by weight
Oxyethylene 2-ethylhexyl ether: 0.30 parts by weight
Oxyethylene oleyl ether: 0.10 parts by weight
Pure water: balance The above composition is mixed and filtered by a 5 μm filter to obtain Bk ink 4.

—Inkjet Recording—

The same inkjet recording apparatus is provided as in Example 1 except that the ejection amount with respect to one liquid droplet of the ink is adjusted to 1.3 ng.

Image recording is then performed using the obtained Bk ink 4 and the inkjet recording apparatus.

Example 2

—Preparation of Ink—

CAB-O-JET 400 (manufactured by Cabot Corporation, pigment concentration: 15% by weight): 30 parts by weight
Glycerin: 20 parts by weight
Oxyethylene 2-ethylhexyl ether: 0.35 parts by weight
Oxyethylene stearyl ether: 0.15 parts by weight
Pure water: balance The above composition is mixed and filtered by a 5 μm filter to obtain Bk ink 5.

—Inkjet Recording—

The same inkjet recording apparatus is provided as in Example 1.

Image recording is then performed using the obtained Bk ink 5 by the inkjet recording apparatus.

Example 3

—Preparation of Ink—

CAB-O-JET 400 (manufactured by Cabot Corporation, pigment concentration: 15% by weight): 40 parts by weight
Glycerin: 15 parts by weight
Diethylene glycol: 10 parts by weight
Oxyethylene 2-ethylhexyl ether: 0.13 parts by weight
Oxyethylene cetyl ether: 0.1 parts by weight
Pure water: balance The above composition is mixed and filtered by a 5 μm filter to obtain Bk ink 6.

—Inkjet Recording—

The same inkjet recording apparatus is provided as in Example 1 except that the ejection amount with respect to one liquid droplet of the ink is adjusted to 1.5 ng.

Image recording is then performed using the obtained Bk ink 6 and the inkjet recording apparatus.

Comparative Example 5

—Preparation of Ink—

Experimentally-produced self-dispersing pigment dispersion liquid (pigment concentration: 8% by weight): 60 parts by weight
Glycerin: 10 parts by weight
Diethylene glycol: 5 parts by weight
Oxyethylene-oxypropylene block polymer: 0.1 parts by weight
Pure water: balance The above composition is mixed and filtered by a 5 μm filter to obtain Bk ink 7.

—Inkjet Recording—

The same inkjet recording apparatus is provided as in Example 1 except that the ejection amount with respect to one liquid droplet of the ink is adjusted to 1.4 ng.

Then, an attempt is made to record an image using the obtained Bk ink 7 and the inkjet recording apparatus. However, image recording can not be performed sufficiently since ink clogging occurs in the recording apparatus presumably due to a large amount of sedimentation and coagulation of the pigment.

Comparative Example 6

—Preparation of Ink—

CAB-O-JET 400 (manufactured by Cabot Corporation, pigment concentration: 15% by weight): 30 parts by weight
Diethylene glycol: 10 parts by weight
Propylene glycol: 5 parts by weight
Diethylene glycol monobutyl ether: 3 parts by weight
Oxyethylene oleyl ether: 1.5 parts by weight
Pure water: balance The above composition is mixed and filtered by a 5 μm filter to obtain Bk ink 8.

—Inkjet Recording—

The same inkjet recording apparatus is provided as in Example 1 except that the ejection amount with respect to one liquid droplet of the ink is adjusted to 1.4 ng.

Image recording is then performed using the obtained Bk ink 8 by the inkjet recording apparatus.

Comparative Example 7

The same inkjet recording apparatus is provided as in Example 1 except that the ejection amount with respect to one liquid droplet of the ink is adjusted to 0.7 ng.

Image recording is then performed using the Bk ink 1 prepared in Example 1 and the inkjet recording apparatus.

Example 4

—Preparation of Ink—
CAB-O-JET 400 (manufactured by Cabot Corporation, pigment concentration: 15% by weight): 23.3 parts by weight
Glycerin: 15 parts by weight
Oxyethylene 2-ethylhexyl ether: 0.25 parts by weight
Oxyethylene oleyl ether: 0.07 parts by weight
Urea: 6 parts by weight
Pure water: balance
The above composition is mixed and filtered by a 5 μm filter to obtain Bk ink 9.
—Inkjet Recording—
The same inkjet recording apparatus is provided as in Example 1 except that the ejection amount with respect to one liquid droplet of the ink is adjusted to 1.4 ng.
An image is then recorded using the obtained Bk ink 9 and the inkjet recording apparatus.

Example 5

—Preparation of Ink—
CAB-O-JET 400 (manufactured by Cabot Corporation, pigment concentration: 15% by weight): 50 parts by weight
Glycerin: 15 parts by weight
Oxyethylene 2-ethylhexyl ether: 0.25 parts by weight
Oxyethylene oleyl ether: 0.07 parts by weight
Urea: 6 parts by weight
Pure water: balance
The above composition is mixed and filtered by a 5 μm filter to obtain Bk ink 10.
—Inkjet Recording—
The same inkjet recording apparatus is provided as in Example 1 except that the ejection amount with respect to one liquid droplet of the ink is adjusted to 1.4 ng.
Image recording is then performed using the obtained Bk ink 10 and the inkjet recording apparatus.

Example 6

The same inkjet recording apparatus equipped with a thermal system recording head in which the ejection amount is adjusted to 1.4 ng is provided as in Example 1, except that the recording head is configured such that the ink supply to the recording head is one-way supply from an ink tank to a nozzle.
Image recording is then performed using the Bk ink 1 prepared in Example 1 and the inkjet recording apparatus.
However, since nozzle clogging is significant, image recording can only be performed with repeated maintenance of the head immediately before printing and further maintenance of the head is necessary when printing is performed again after pausing the image recording.

Example 7

—Preparation of Ink—
Experimentally-produced self-dispersing pigment dispersion liquid (pigment concentration: 10% by weight): 50 parts by weight
Dipropylene glycol: 5 parts by weight
Triethylene glycol: 10 parts by weight
Oxyethylene oleyl ether: 0.1 parts by weight
Pure water: balance
The above composition is mixed and filtered by a 5 μm filter to obtain Bk ink 11.
—Inkjet Recording—
The same inkjet recording apparatus is provided as in Example 1 except that the ejection amount with respect to one liquid droplet of the ink is adjusted to 1.8 ng.
Image recording is then performed using the obtained Bk ink 11 and the inkjet recording apparatus.

Example 8

The same inkjet recording apparatus is provided as in Example 1 except that the ejection amount with respect to one liquid droplet of the ink is adjusted to 1.0 ng.
Image recording is then performed using the Bk ink 1 prepared in Example 1 and the inkjet recording apparatus.
—Example 9—
—Preparation of Ink—
Experimentally-produced self-dispersing pigment dispersion liquid (pigment concentration: 8% by weight): 60 parts by weight
Glycerin: 10 parts by weight
Oxyethylene stearyl ether: 0.2 part by weight
Pure water: balance
The above composition is mixed and filtered by a 5 μm filter to obtain Bk ink 12.
—Inkjet Recording—
The same inkjet recording apparatus is provided as in Example 1 except that the ejection amount with respect one liquid droplet of the ink is adjusted to 1.6 ng.
Image recording is then performed using the obtained Bk ink 12 and the inkjet recording apparatus.

Example 10

The same inkjet recording apparatus is provided as in Example 1 except that the ejection amount with respect to one liquid droplet of the ink is adjusted to 1.9 ng.
Image recording is then performed using the Bk ink 1 prepared in Example 1 and the inkjet recording apparatus.
Evaluation
(Evaluation 1)
For the ink in each Example, the volume average particle diameter of the pigment and the dynamic contact angle at 50 seconds after dropwise addition of 3 μl of the ink to plain paper (color/monochrome copy paper (trade name: C2, manufactured by Fuji Xerox Co., Ltd.) is employed in the present Examples) are examined. The results are shown in Table 1.
(Evaluation 2)
The recorded image obtained by performing the image recording in each Example is evaluated as follows. The results are shown in Table 1.
—Image Bleeding—
Regarding image bleeding, a 2 dot-line image is printed and a sensory evaluation is performed according to the following criteria. The criteria for the evaluation are as follows.
A: No whisker-like image distortion is confirmed by visual observation or a magnifying glass.
B: No apparent bleeding that can be confirmed by visual observation is observed, but slight image distortion is detected when observation is performed by the magnifying glass.
C: Slight whisker-like image distortion is detected by visual observation.

D: A large amount of clear whisker-like image distortion is observed on many portions by visual observation.

—Optical Density of Image—

A solid patch having a coverage of 100% is printed, and the optical density of the image is examined using X-Rite 404 (manufactured by X-Rite Inc.). The evaluation criteria are as follows.

A: The optical density determined by calculating the average of 5 points is 1.2 or more.

B: The optical density determined by calculating the average of 5 points is from 1.1 to less than 1.2.

C: The optical density determined by calculating the average of 5 points is less than 1.1.

—Drying Speed—

The drying speed is evaluated as follows: under a continuous printing mode, a solid patch having a size of 1×2 cm is printed on the latter half of the first sheet, no image is printed on the second sheet (blank paper), and it is observed whether or not the back surface of the second sheet is blemished by the image on the first sheet. The evaluation criteria are as follows.

A: No blemish image is observed even when the printing interval between the first and second sheets is an interval of 1 second.

B: No blemish image is observed when the printing interval between the first and second sheets is a interval of 2 seconds, but a slight blemish image is observed when the printing interval is an interval of 1 second.

C: A clear blemish image is detected even when the printing interval between the first and second sheets is an interval of 3 seconds.

of the present exemplary embodiment as compared to the Comparative Examples. Furthermore, it is understood that in addition to excellent drying time and optical density of the image, favorable suppression of image bleeding is obtained in the Examples of the present exemplary embodiment as compared to the Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inkjet recording method comprising recording by ejecting liquid droplets of an ink onto a recording medium from an ejection head that ejects, by heat, the liquid droplets of the ink at an ejection amount with respect to one droplet of from approximately 1 ng to approximately 2 ng to thereby attach the liquid droplets of the ink to the recording medium, wherein the ink comprises a pigment having a volume average particle diameter of from approximately 100 nm to approximately 400 nm and has a dynamic contact angle of

TABLE 1

| | Ink | | | Recording head | | Evaluation | | |
|---|---|---|---|---|---|---|---|---|
| | Volume average particle diameter of pigment (nm) | Dynamic contact angle (°) | Pigment concentration (% by weight) | Ejection amount with respect to one liquid droplet of ink (ng) | Ink supply system of recording head | Image bleeding | Optical density of image | Drying speed |
| Example 1 | 125 | 52 | 5 | 1.4 | Circulation system | A | B | B |
| Example 2 | 115 | 32 | 4.5 | 1.4 | Circulation system | C | B | B |
| Example 3 | 124 | 58 | 6 | 1.5 | Circulation system | B | B | C |
| Example 4 | 122 | 50 | 3.5 | 1.4 | Circulation system | B | C | B |
| Example 5 | 125 | 55 | 7.5 | 1.4 | Circulation system | B | B | B |
| Example 6 | 125 | 52 | 5 | 1.4 | One-way | B | B | B |
| Example 7 | 102 | 58 | 5 | 1.8 | Circulation system | B | C | C |
| Example 8 | 125 | 52 | 5 | 1.0 | Circulation system | A | C | B |
| Example 9 | 175 | 50 | 4.8 | 1.6 | Circulation system | B | B | B |
| Example 10 | 125 | 52 | 5 | 1.9 | Circulation system | B | B | C |
| Comparative Example 1 | 125 | 52 | 5 | 2.8 | Circulation system | B | B | D |
| Comparative Example 2 | 92 | 65 | 5 | 1.5 | Circulation system | B | D | D |
| Comparative Example 3 | 129 | 71 | 6 | 1.3 | Circulation system | A | B | D |
| Comparative Example 4 | 88 | 48 | 5 | 1.3 | Circulation system | C | D | B |
| Comparative Example 5 | 440 | 58 | 4.8 | 1.4 | Circulation system | — | — | — |
| Comparative Example 6 | 123 | unmeasurable due to permeation of ink before the point of 50 s | 4.5 | 1.4 | Circulation system | D | D | B |
| Comparative Example 7 | 125 | 52 | 5 | 0.7 | Circulation system | A (image distortion due to defect of ejection direction was observed) | D | B |

It is understood from the results that excellent drying time and optical density of the image are obtained in the Examples from approximately 30° to approximately 60°, 50 seconds after dropwise addition of 3 μl of the ink to plain paper.

2. The inkjet recording method according to claim 1, wherein the ejection head is an ejection head that supplies the ink by circulating the ink inside the ejection head.

3. The inkjet recording method according to claim 1, wherein a content of the pigment in the ink is from approximately 4% by weight to approximately 8% by weight.

4. An inkjet recording apparatus comprising an ejection head that ejects liquid droplets of an ink, by heat, at an ejection amount with respect to one droplet of from approximately 1 ng to approximately 2 ng, wherein the ink comprises a pigment having a volume average particle diameter of from approximately 100 nm to approximately 400 nm and has a dynamic contact angle of from approximately 30° to approximately 60°, 50 seconds after dropwise addition of 3 µl of the ink to plain paper.

5. The inkjet recording apparatus according to claim 4, wherein the ejection head is an ejection head that supplies the ink by circulating the ink inside the ejection head.

6. The inkjet recording apparatus according to claim 4, wherein a content of the pigment in the ink is from approximately 4% by weight to approximately 8% by weight.

7. An ink for inkjet recording, comprising a pigment having a volume average particle diameter of from approximately 100 nm to approximately 400 nm and has a dynamic contact angle from approximately 30° to approximately 60°, 50 seconds after dropwise addition of 3 µl of the ink to plain paper.

8. The ink for inkjet recording according to claim 7, wherein a content of the pigment in the ink is from approximately 4% by weight to approximately 8% by weight.

\* \* \* \* \*